(12) United States Patent
Levy

(10) Patent No.: US 8,277,654 B2
(45) Date of Patent: *Oct. 2, 2012

(54) WATER PURIFICATION APPARATUS AND SYSTEM

(75) Inventor: Ehud Levy, Roswell, GA (US)

(73) Assignee: Selecto, Inc., Suwanee, GA (US)

( * ) Notice: Subject to any disclaimer, the term of this patent is extended or adjusted under 35 U.S.C. 154(b) by 879 days.

This patent is subject to a terminal disclaimer.

(21) Appl. No.: 12/222,358

(22) Filed: Aug. 7, 2008

(65) Prior Publication Data

US 2010/0219131 A1  Sep. 2, 2010

Related U.S. Application Data

(63) Continuation-in-part of application No. 11/372,789, filed on Mar. 10, 2006, now Pat. No. 7,429,326, which is a continuation-in-part of application No. 10/723,271, filed on Nov. 26, 2003, now Pat. No. 7,229,552.

(51) Int. Cl.
*B01D 24/00* (2006.01)

(52) U.S. Cl. .................. 210/282; 210/266

(58) Field of Classification Search .......... 210/256, 210/266, 282, 663
See application file for complete search history.

(56) References Cited

U.S. PATENT DOCUMENTS

| | | | |
|---|---|---|---|
| 3,815,752 A | 6/1974 | Hoffman et al. | |
| 3,950,251 A | 4/1976 | Hiller | |
| 4,061,807 A | 12/1977 | Shaler et al. | |
| 4,116,738 A | 9/1978 | Pall | |
| 4,139,354 A | 2/1979 | Giles | |
| 4,353,746 A | 10/1982 | Birchall et al. | |
| 4,450,082 A | 5/1984 | Tanouchi et al. | |
| 4,626,350 A | 12/1986 | Reid | |
| 4,637,881 A | 1/1987 | Sciuto | |
| 4,654,142 A | 3/1987 | Thomsen et al. | |
| 4,753,728 A * | 6/1988 | VanderBilt et al. | 210/282 |
| 5,024,764 A | 6/1991 | Holler | |
| 5,092,990 A | 3/1992 | Muramatsu et al. | |
| 5,096,721 A | 3/1992 | Levy | |
| 5,102,542 A | 4/1992 | Lawrence et al. | |
| 5,133,871 A | 7/1992 | Levy | |
| 5,189,092 A | 2/1993 | Koslow | |
| 5,192,571 A | 3/1993 | Levy | |
| 5,249,948 A | 10/1993 | Koslow | |
| 5,290,345 A | 3/1994 | Osendorf et al. | |
| 5,331,037 A | 7/1994 | Koslow | |

(Continued)

OTHER PUBLICATIONS

Wu, X., et al., "Use of Activated Carbons for the Removal of Sulfur Impurities from Gas Streams," 2003 Fuel Cell Seminar, Nov. 3-7, 2003, Miami Beach, FL.

*Primary Examiner* — Duane Smith
*Assistant Examiner* — Sonji Turner
(74) *Attorney, Agent, or Firm* — Buchanan Ingersoll & Rooney PC

(57) ABSTRACT

The invention relates to a two-stage design for a water purification system, with water to be purified first passing through a first stage containing particulate filtration media, and a second stage containing a porous filtration block. The particulate filtration media can be the same as, or different from, material included in the porous block. Either material may be any material that removes contaminants from water by, e.g., absorption, adsorption, ion exchange, sequestration, or other mechanism, or any combination of these.

30 Claims, 4 Drawing Sheets

U.S. PATENT DOCUMENTS

| | | | |
|---|---|---|---|
| 5,338,458 A | 8/1994 | Carrubba et al. | |
| 5,356,849 A | 10/1994 | Matviya et al. | |
| 5,401,416 A | 3/1995 | Levy | |
| 5,538,746 A | 7/1996 | Levy | |
| 5,562,941 A | 10/1996 | Levy | |
| 5,609,759 A | 3/1997 | Nohren et al. | |
| 5,612,522 A | 3/1997 | Levy | |
| 5,616,243 A | 4/1997 | Levy | |
| 5,714,126 A | 2/1998 | Frund | |
| 6,165,362 A * | 12/2000 | Nohren et al. | 210/266 |
| 6,225,256 B1 | 5/2001 | Shawabkeh et al. | |
| 6,241,893 B1 | 6/2001 | Levy | |
| 6,342,129 B1 | 1/2002 | Vaughn et al. | |
| 6,368,504 B1 | 4/2002 | Kuennen et al. | |
| 6,383,395 B1 | 5/2002 | Clarke et al. | |
| 6,524,477 B1 | 2/2003 | Hughes | |
| 6,630,106 B1 | 10/2003 | Levy | |
| 6,638,551 B1 | 10/2003 | Levy et al. | |
| 6,662,956 B2 | 12/2003 | Levy | |
| 6,764,601 B1 | 7/2004 | Levy et al. | |
| 6,960,328 B2 | 11/2005 | Bortun et al. | |
| 7,112,272 B2 * | 9/2006 | Hughes et al. | 264/45.1 |
| 7,112,280 B2 | 9/2006 | Hughes et al. | |
| 7,160,453 B1 | 1/2007 | Matsumura et al. | |
| 7,169,297 B2 | 1/2007 | Bortun et al. | |
| 7,169,304 B2 * | 1/2007 | Hughes et al. | 210/501 |
| 7,202,195 B2 | 4/2007 | Cannon et al. | |
| 7,229,552 B1 | 6/2007 | Levy | |
| 7,252,767 B2 | 8/2007 | Bortun et al. | |
| 7,264,726 B1 | 9/2007 | Levy | |
| 7,288,498 B1 | 10/2007 | Levy | |
| 7,300,587 B2 | 11/2007 | Smith et al. | |
| 7,303,683 B2 * | 12/2007 | Cumberland | 210/660 |
| 7,357,868 B2 | 4/2008 | Levy | |
| 7,429,326 B2 | 9/2008 | Levy | |
| 7,442,310 B2 | 10/2008 | Bortun et al. | |
| 2004/0045903 A1 | 3/2004 | Johnson | |
| 2004/0060873 A1 | 4/2004 | Yanou et al. | |
| 2004/0206682 A1 | 10/2004 | Hamlin et al. | |
| 2005/0035062 A1 | 2/2005 | Hiltzik et al. | |
| 2007/0221569 A1 | 9/2007 | Stouffer et al. | |

* cited by examiner

WATER PURIFICATION APPARATUS AND SYSTEM

This application is a continuation-in-part of U.S. Ser. No. 11/372,789, filed Mar. 10, 2006 now U.S. Pat. No. 7,429,326, which is a continuation-in-part of U.S. Ser. No. 10/723,271, filed Nov. 26, 2003 now U.S. Pat. No. 7,229,552, the entire contents of each of which are incorporated herein by reference.

BACKGROUND OF THE INVENTION

1. Field of the Invention

This invention relates to apparatus and systems for efficient and effective purification of water to provide improved pressure drop characteristics and capacity as compared to purification systems using conventional carbon blocks. The apparatus and system provides substantially decreased levels of dust and fine particulates in water purified using the apparatus, when compared to conventional carbon block-based filters.

2. Description of Related Art

Water filtration media containing extruded or molded carbon blocks (particles of granulated activated carbon held together formed into a desired shape and held together with a polymeric binder) have been known in the art. For instance, U.S. Pat. Nos. 5,189,092; 5,249,948; and 5,331,037 disclose carbon blocks used to purify water prepared by extruding carbon particles with a polymeric resin.

These conventional carbon blocks, while functional, present several disadvantages in use. First, the capacity of the blocks is limited by the kinetics of adsorption onto the carbon surfaces and into the pores of the bound carbon particles. Because so much of the surface area of the carbon particles is occluded by binder resin, the capacity of filters of reasonable size and number to treat water is rather limited in terms of volumetric flow rate. In addition, the total volume of water treated is limited because of clogging of the filter due to the presence of small particulates and other detritus in the water being filtered, as well as because of the saturation of the limited number of active sites on the carbon particulate.

Second, both the volumetric flow rate and the total volume of water treated can be limited by the structural integrity of the carbon block. Many conventional carbon blocks degrade over a fairly short period of time as the flow of water erodes them, breaking them into smaller blocks that can move around in the flow system and cause clogging.

Third, carbon blocks, in particular extruded carbon blocks, can be difficult to manufacture with high consistency, leading to unpredictable performance results. The binder resins must be heated, either directly or by shear in an extruder, which can passivate some of the carbon, rendering the blocks less effective.

Fourth, existing carbon block formulations are not particularly effective at removing chloramines, rendering them less than desirable for use in water purification systems used in the food processing industry. In particular, catalytic carbonaceous chars can be used for chloramine removal, as disclosed in U.S. Pat. No. 6,342,129, the entire contents of which are incorporated herein by reference. However, the inventor has found that including this material in a carbon block results in a substantial amount of deactivation of the catalytic activity of the carbon, believed to result from the need to heat the binder resin to form the carbon block.

Moreover, chloramine reduction is very complex to achieve by carbon block filters made from regular granulated activated carbon, be it molded or extruded, etc. For example, extruded carbon block can remove chlorine with one pound of highly activated coconut shell carbon at a flow rate of approximately 2 gpm with $80 \times 325$ mesh carbon particles and 15% polymeric binder for approximately 7,000 gallons to meet NSF Standard 42 at 2 ppm influent chlorine and 0.5 ppm effluent. Where the same filter needs to reduce chloramine at 2 ppm, its capacity is barely 200 gallons at the same flow rate.

Special catalytic carbons have been developed to remove chloramine, but when they have been molded or extruded into carbon block, they lose 90% of their efficiency for chloramine removal. Different carbons have different adsorption capacities; however, coconut shell carbon, coal based carbon and other nut-derivative materials all demonstrate a ratio of 20:1 or 30:1 capacity between their ability to remove chlorine and their ability to reduce chloramine.

Water pH is also a factor in the effectiveness of the chloramines removal media. The pH of chloramine in water is extremely high, generally between about 8.5 and about 9.6. At this pH level, most carbon loses its removal efficiency quite rapidly, if not immediately. Since a water filter requires a minimum amount of water flow to function effectively and economically, the size of the filter becomes critical. With regular carbon, to achieve chloramine reduction at the same capacity as chlorine with the same filter, a sufficiently long contact time is needed such that the filter must be about 10 to about 20 times larger than is necessary if only chlorine is to be removed.

Carbon block filtration results in other disadvantages as well. It is often difficult to prepare carbon blocks with adequate control over the particle size of the particulate carbon used to make the blocks. This can result in the use of carbon containing significant quantities of dust, which can migrate through the carbon block, clog pores, and create unduly large pressure drops through the block, which can block as much as 50% to 90% of the rated flow rate through the filter block. Plugging of the filter also creates inconsistencies in water flow. Carbon made from coconut shell, in particular, can swell in the presence of VOC, further constricting fluid flow and increasing pressure drop.

An alternative to carbon block technology is the use of granulated carbon and other filtration media, generally having a particle size distribution ranging from about 50 mesh to about 28 mesh, in a canister through which the water to be purified flows. Again, while this arrangement is functional, particularly when coupled with a downstream carbon block purification step, the capacity of the system is generally limited to around 6,000 to 7,000 gallons. As with carbon block filters, a challenge associated with using granulated carbon media is creation of a filtration material that avoids imparting dust from activated carbon or other purification media to the water being treated, and is capable of removing dust and fine particulates from the water.

Carbon block filters and filters using granulated filtration media each provide less than optimal results in removal of small particulates from water. For example, it would be desirable to have a filtration cartridge that is self-contained, easy to use and replace, and capable of removing fine dust and particulates, e.g., ISO 12103-82 0-80 micron dust, from water.

Accordingly, there remains a need in the art for a water purification apparatus and system that does not suffer from the disadvantages of carbon block based systems or granulated filtration media based systems, that can purify water at high capacity, and that can be adapted to effectively remove chloramines from water. In addition, there remains a need for an essentially modular system, which provides effective water purification through the use of a single cartridge, yet which provides sufficient flexibility in manufacture that different filtration media can be used without multiplying the inventory of parts needed to produce the system.

SUMMARY OF THE INVENTION

The device described in this application avoids the disadvantages encountered with available carbon block filtration, and is particularly well suited to removal of small particulates, as well as chloramine removal. In particular, the apparatus of the invention substantially limits the amount of dust, whether from activated carbon or other filtration media, imparted to the water being treated, and is better able to remove dust and fine particulates (e.g., ISO 12103-82 0-80 micron dust) when compared to conventional carbon block filtration.

The device described herein uses a two-stage design, with water to be purified first passing through a first stage containing particulate and/or fibrous filtration media, and a second stage containing a porous filtration block. The particulate filtration media can be the same as, or different from, material included in the porous block. Either material may be any material that removes contaminants from water by, e.g., absorption, adsorption, ion exchange, sequestration, or other mechanism, or any combination of these.

In one embodiment, is disclosed a purification system wherein the first stage contains particulate purification media, e.g., particulate or fibrous carbon, in particular an activated carbon, even more particularly a hollow core or catalytic carbon, having an average particle size of approximately 50 to approximately 200 mesh, more particularly, approximately 80 to approximately 325 mesh, disposed in a porous shell that allows water to enter the device and contact the purification media. The porous shell itself functions as a "pre-filter", and desirably contains a material having a micron rating of approximately 20 to approximately 100, in order to exclude some particulate matter from the interior of the filtration system. Suitable carbons include those made from wood, coal, or coconut shell, and desirably include a percentage of hollow core carbon, such as that sold by MeadWestvaco under the tradename AquaGard. The percentage of such particles in the particulate media ranges between 0 and 100%, more particularly between about 20 and 100%, even more particularly between about 50 and 100%. The carbon particles are desirably compacted and densified by vibration, e.g., by vibrating for about 10 minutes on an FMC Syntron J60 Jogger vibrating table, set on maximum power.

After leaving the first stage, the water contacts a porous block, which can be made by extrusion molding or by other polymer processing. The block contains purification material, such as active carbon, which has an average particle size ranging from about 80 to about 325 mesh. Without wishing to be bound by any theory, it is believed that the ability of the particulate purification material in the first stage to reduce contaminants, such as chloramines, by approximately 60% to approximately 99% allows the porous block in the second stage to complete the reduction of contaminant to even lower levels. With the use of catalytic carbon in the first stage and carbon block in the second stage, chloramines can be reduced to levels that are not detectable using conventional detection equipment or techniques.

Moreover, by careful selection of the particle size of the purifying media in the first stage, a system can be obtained that is 99% dust free. This allows water to flow through the purification system with much lower pressure drops than are achievable with existing systems. In addition, the selection of particle size ranges for the first stage results in very high removal kinetics with particular purification materials, such as catalytic carbon. In addition, by vibrating the particles as indicated herein, a packing of the filtration media particles is obtained that substantially traps any dust that might be imparted from the media to the water, as well as any dust or fine particulates (e.g., ISO 12103-82 0-80 micron dust) that may be present in the water from any source.

In a particular embodiment, the purifying media contains particles having a BET specific surface area ranging between about 1200 $m^2/g$ and about 1800 $m^2/g$, more particularly between about 1400 $m^2/g$ and about 1600 $m^2/g$, even more particularly between about 1450 and about 1550 $m^2/g$, even more particularly around 1500 $m^2/g$.

In another particular embodiment, the purifying media contains particles having a pore distribution having an average pore diameter, for pores ranging in size between 896.2 and 199.8 Å, that ranges between about 220 Å and about 235 Å, more particularly between about 225 Å and about 230 Å, and having an average pore diameter, for pores ranging in size between 38.4 and 32.4 Å, that ranges between about 33 Å and about 36 Å, more particularly between about 34 Å and around 35 Å.

In another particular embodiment, the purifying media contains particles having a BJH cumulative pore volume between about 0.133 $cm^3/g$ and about 0.622 $cm^3/g$, more particularly between about 0.135 $cm^3/g$ and about 0.617 $cm^3/g$, even more particularly between about 0.136 $cm^3/g$ and about 0.614 $cm^3/g$, even more particularly between about 0.592 and about 0.622 $cm^3/g$.

In another particular embodiment, the purifying media contains particles having a BJH cumulative pore surface area (of pores of a diameter between 17 and 3000 Å) between about 50 $m^2/g$ and about 366 $m^2/g$, more particularly between about 124 $m^2/g$ and about 359 $m^2/g$, even more particularly between about 345 $m^2/g$ and about 359 $m^2/g$, even more particularly about 355 $m^2/g$.

In another particular embodiment, the purifying media contains particles having a single point surface area at $P/P_0=0.31$ of between about 1400 and about 1500 $m^2/g$, more particularly, between about 1440 and about 1490 $m^2/g$, even more particularly between about 1470 and about 1480 $m^2/g$, even more particularly around 1475 $m^2/g$.

In another particular embodiment, the purifying media contains particles having a single point adsorption total pore volume of pores less than 896.21 Å diameter at about $P/P_0=0.9779$ of between about 1.0 and about 1.30 $cm^3/g$, more particularly between 1.1 and about 1.25 $cm^3/g$, more particularly about 1.23 $cm^3/g$.

In another particular embodiment, the purifying media contains particles having an adsorption average pore diameter (4V/A by BET) of between about 30 and about 35 Å, more particularly between about 31 and about 34 Å, even more particularly about 33 Å.

In another particular embodiment, the purifying media contains particles having a BJH adsorption average pore diameter (4V/A) of between about 65 and about 75 Å, more particularly between about 68 and about 72 Å, even more particularly about 69 Å.

Desirably, in any of the embodiments described above, the purifying media particles may have a particle size distribution of 50×200 or of 80×325. Irrespective of the particular particle size distribution, the purifying media particles described above may be particulate carbon, more particularly, activated carbon, even more particularly hollow core or catalytic carbon. Irrespective of the particle size distribution and/or the type of particulate material, the purifying media can be desirably vibration-compacted to a packed density of about 0.2 g/cc to about 1.3 g/cc.

In another embodiment is described filtration media as described above, wherein the porous block contains, in addition to or in place of some or all of the particulate carbon, a quantity of carbon fibers and polyester fibers. Desirably, the carbon fibers, polyester fibers, and/or particulate carbon are bound together by an binder resin. This porous block material provides an extremely low pressure drop when compared to conventional porous carbon block filters. This embodiment provides filtered water that is substantially free of dust, in particular, substantially free of ISO 12103-82 0-80 micron dust.

BRIEF DESCRIPTION OF DRAWINGS

FIG. 1 shows one embodiment of a cartridge according to the invention.

DETAILED DESCRIPTION OF SPECIFIC EMBODIMENTS

Figure 1A:
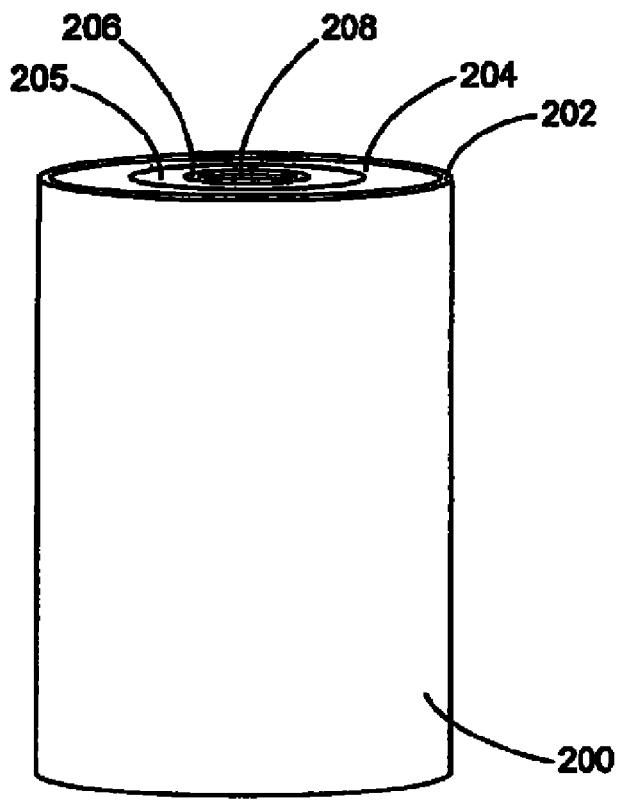
FIG. 1A shows a perspective view of this embodiment of the cartridge.

As used herein, the term "about" used with respect to a stated numerical value denotes a value that may be somewhat above or below the stated number, to a maximum of ±10% of the numerical value, or the measurement error inherent in the measurement technique used to determine the numerical value, whichever is larger. When used with respect to a numerical range, the term applies to each endpoint of the range.

In order to obtain the particular advantages described above, selection of an appropriate particle size distribution of particulate purification material is important. While other ranges can be made to work, it has been found that a range of about 50 to about 200 mesh is particularly suitable, and will attain all of the advantages described above. Substantially coarser particles such as 20.times.50 or 50.times.80 mesh, provide insufficient surface area, effectively decreasing the contact time of the water with the carbon surface for a given flow rate. As a result, reduction of chloramine is below what it could be with particle sizes in the range described above. Using particle sizes significantly smaller than the range described above risks passing the particles on to the porous block, where they can clog pores and reduce system efficiency, or of passing the particles into the system effluent. Particles having a particle size distribution of 80×325 are also particularly suitable.

The first stage of the filter can contain particulate purification material similar to that used in the porous carbon block, but without the use of binder. Disposition of the powder within the porous shell creates a compacted fine filter without any binder to hold the particles together or to obstruct or cover any of the particle surface. This arrangement allows water to flow through the porous material past the particles with a pressure drop as low as 2 psi. The material used as the central core of the system (i.e., a porous block) depends on the micron rating, and may have additional pressure drop of around 4 psi.

The particulate purification material used in the first stage can be carbon, in particular, activated carbon, more particularly, activated catalytic carbon. Examples of suitable activated catalytic carbon include Calgon Centaur carbon, or AquaGuard carbon made by MeadWestVaco. The activated carbon may also be based on (i.e., prepared from using known techniques for preparing activated carbon) wood ("wood-based carbon") or coal ("coal-based carbon"), or some combination thereof.

Other materials usable in the same range of particle sizes include metal oxides and hydroxides, such as zirconium hydroxide, zirconium oxide, titanium oxide and magnesium hydroxide. Any of these materials can be used in conjunction with a 50.times.200 mesh porous carbon block in the second stage.

The particulate materials used in the first stage are desirably compacted by vibration using an FMC Syntron J60 Jogger on maximum power for 10 min. This vibration step compacts, e.g., 80.times.325 mesh carbon produced under the name AQUAGARD, or by Calgon, or other carbon manufacturers, so that the spacing between particles traps dust approximately 10-40 times better than molded carbon blocks. The resulting cartridge can remove fine AC dust (0-80 .mu.m) to a 99.99% reduction, even if the first and second porous layers are not submicron rated.

For example, a 4.5 inch by 20 inch purification cartridge made according to the invention using a porous block containing carbon fiber and vibrated was tested at a 5 gpm flow rate using water that had been seeded with carbonic 0-80 micron dust to a turbidity of 13 NTU. The resulting effluent contained 0 NTU of carbonic 0-80 micron dust. A laser counter was used to evaluate the level of 0-80 .mu.m activated carbon dust before and after treatment. This test indicated a reduction of 99.99 percent from an initial concentration of 200,000 counts per cm.sup.3.

When water seeded with the amount of activated carbon dust described above was run through the purification cartridge described above for 230 minutes, until the cartridge was clogged, the total dust loading capacity was found to be over 118 grams. Total dust loading for a submicron extruded carbon block filter (KX Industries) was 8 grams and for a conventionally produced submicron carbon block filter (Pentair) was 9.7 grams.

Additionally, the purification cartridge of the invention can be used to effectively remove microbial contaminants. Using the same cartridge specifications and flow characteristics as described above for particulate removal, and following EPA protocols for testing particulate and cyst reduction, 5000 gallons of water seeded with 90,000 count/cc of cysts and a resulting turbidity of 36 NTU was reduced by 99.9% for 4 days of filtration The ability of the water to flow through hydroxides and oxides, such as titanium oxides (e.g., titanium dioxide), aluminasilicates, zirconium hydroxide and zirconium oxide, without binder to hold the material together against the radial flow improves the kinetics of arsenic reduction by a factor as high as 60:1. Using current NSF arsenic reduction test protocols at pH of 8.5 and 6.5, two gallons of water per minute can pass through the two stage filter and reduce of arsenic to non-detectable levels for approximately 1,600 gallons. The method for improving fluid flow with small particles without bypass is believed to provide turbulent flow near the particles so that the purification process maintains very high kinetics. The second stage functions mainly to further reduce levels by removing material remaining after treatment in the first stage. Combined, the two stages maximize efficiency, and provide a level of purification that cannot be achieved using either stage separately, or using both stages in a different configuration.

The porous material used to make the outer layer of the filter can desirably be polypropylene or polyethylene, preferably high-density polyethylene, even more preferably GUR type made by Ticona, more particularly GUR 2122, GUR 4133, GUR. GUR polymer is very porous and makes a hydrophilic shell that allows water to flow through the plastic with almost no resistance. Since the powder media has been packed by vibration, vacuum or wet packing, there is almost no void space between the particles. The invention design of the cartridge also filters gases, air and toxic fumes, where if the material were molded, there would be no kinetics.

Figure 1B:
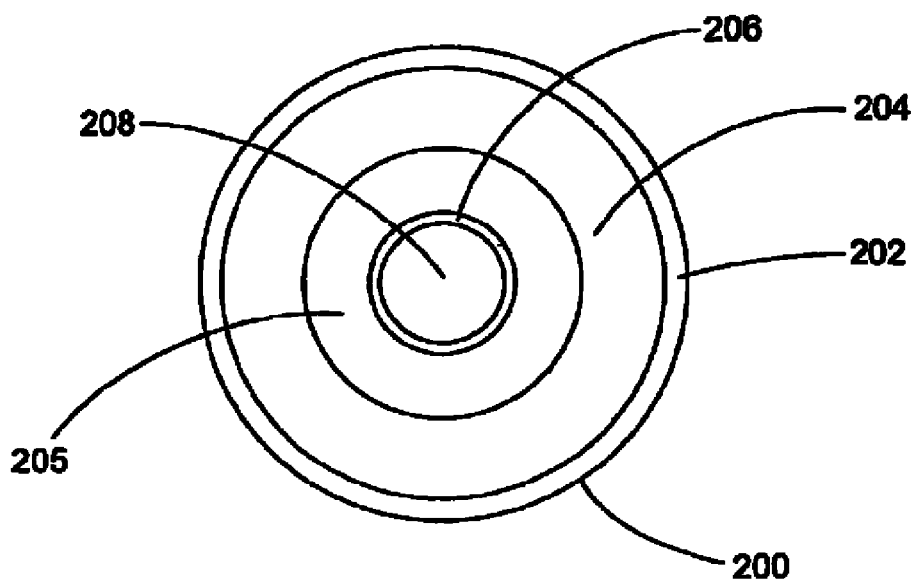
FIG. 1B shows a top view of the same cartridge embodiment.
Figure 2:
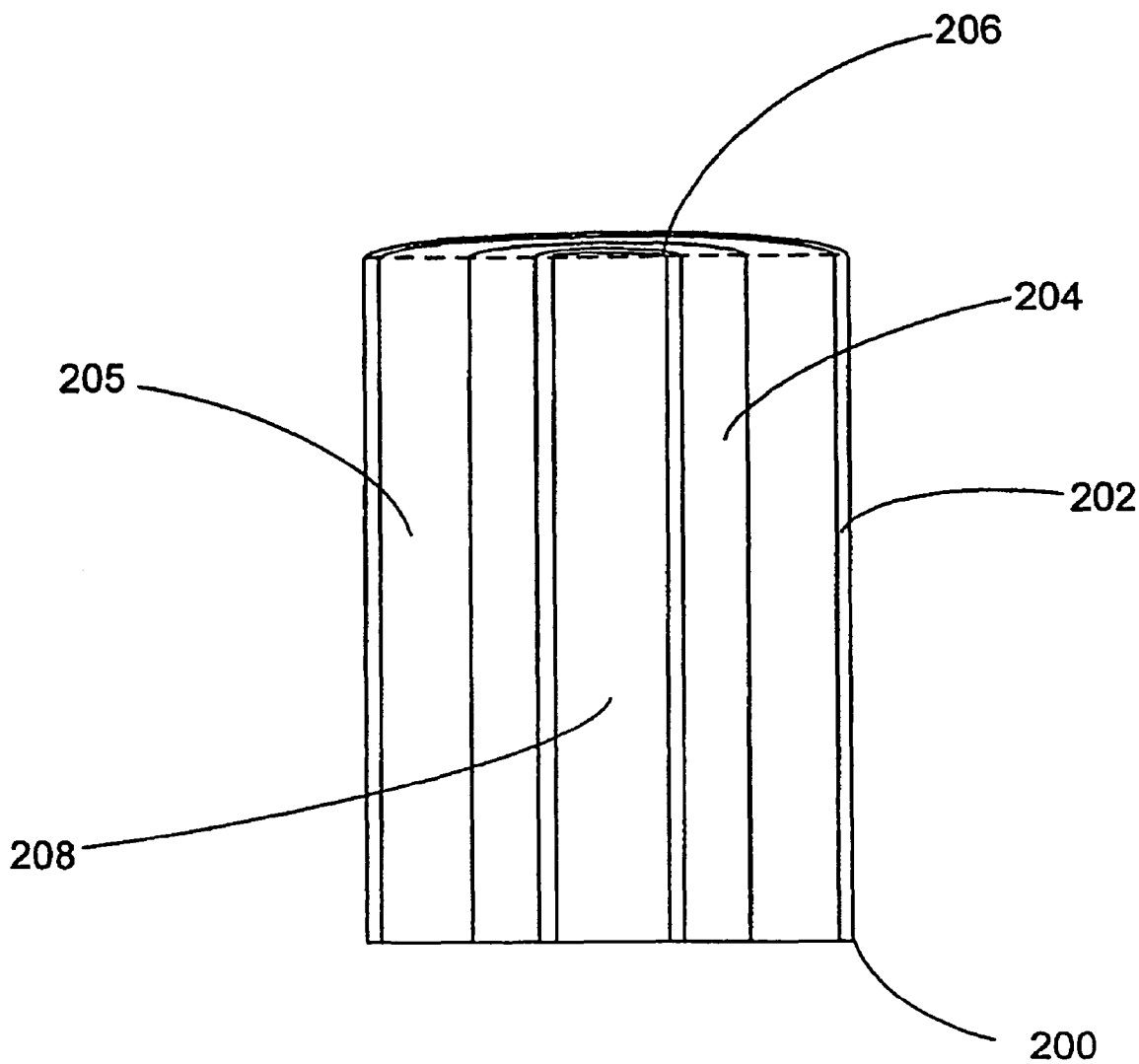
FIG. 2 shows a cross-sectional perspective view of the cartridge of FIGS. 1A and 1B.

In one embodiment, the invention relates to a cartridge for inclusion in water purification systems, illustrated in FIG. 1. The cartridge is shown in a cylindrical shape for ease of illustration and description. Those of skill in the art will understand that other geometries are possible, and that altering the geometry of the cartridge does not avoid use of the inventive concepts disclosed herein. If the water must first pass through a granular or powdered purification media and then pass through a porous purification block, this is generally sufficient to realize the advantages of the invention. Additional advantages are realized when the water must first pass through a porous layer prior to encountering the granular or powdered purification media, or if the powdered purification media is separated from the porous purification block by a porous layer, or if the porous purification block contains activated carbon, or if all of these features are combined.

The cartridge 200 has an outer porous layer 202, an optional inner porous layer 206, a porous purification block 205, and an annular space 204 between the outer porous layer 202 and the porous purification block 205, containing a finely ground powdered purification media. The outer and inner porous layers 202, 206, are generally polymeric materials (and can be, but need not be, the same material) that are sufficiently porous that they are capable of allowing water to pass through them, but not so porous that significant quantities of the purification media powder can escape. Suitable porous polymeric materials include a porous HDPE, such as the GUR (Ticona) polyethylene sold as GUR 2122, GUR 4133, GUR 2105, GUR 4150, and GUR 4170. This material can also have a micron rating in the 10 to 200 range, although all that is necessary for proper functioning of the cartridge is that the porous layer be sufficiently porous to admit the desired flow rate of water, while the pores are sufficiently small that the media is retained within the annular cavity.

The purification media powder has desirably been packed to high density by, e.g., vibrational filling techniques. In this embodiment of the device, water to be purified passes through the outer porous layer 202, contacts the powdered purification media in the annular cavity 204, then contacts the porous filtration block 205, and then passes through the optional inner layer 206, and exits the device through inner annular opening 208, and may optionally be subjected to further purification steps.

The purification media powder used in the cartridge desirably has a particle size distribution ranging from about 375 mesh to about 50 mesh, more particularly from about 325 mesh to about 80 mesh, even more particularly from about 200 mesh to about 50 mesh. The mean particle size can generally be found at a point that is between about 36% and about 85% of the particles in the distribution (i.e., between a particle size where about 36% of the particles in the distribution are smaller than that size, and a particle size where about 85% of the particles in the distribution are smaller).

The powdered purification media used can vary depending upon the type of purification desired, and the impurities present in the water to be purified. Metal hydroxides, metal oxides and carbon can be advantageously used. Examples include powdered activated carbon, in particular hollow core carbon, powdered zirconia, powdered alumina, powdered activated carbon, powdered catalytic char, powdered zeolite, and powdered silicates. The purification media is introduced into the cavity and packed to a density ranging from about 0.2 g/cc to 1.3 g/cc. using vibrational filling techniques with high frequency vibration to minimize void spaces in the material. Pneumatic or magnetic vibration tables are suitable in this regard. These are operated until the material has settled to a predetermined height and weight (i.e., the desired density).

In one embodiment of the invention, which is particularly suitable for removing arsenic from water, titanium dioxide having a particle size distribution between about 40 µm and about 250 µm can be used as the powdered purification media.

In another embodiment of the invention, which is particularly suitable for use in removing chloramines and particulates from water, the powdered purification media used in the cartridge described above can be an activated carbon having a particle size in the range of about 50 mesh to about 200 mesh. Desirably, the carbon particles used as powdered purification media in this invention have a high porosity, such as a porosity in the range of about 50% to about 80%. In an even more particular embodiment for chloramines removal, the powdered purification media can be a carbon that is catalytically active in degrading chloramines. An example of such a powder is that disclosed in U.S. Pat. No. 6,342,129, but catalytic carbon powders prepared by other methods can also be used to advantage in the cartridge, provided that they have particle size distributions in the ranges described above, and they can catalytically decompose at least a portion of the chloramines with which they come into contact. Suitable carbons for this use include wood, coal, or coconut shell based carbons, as well as hollow core carbons such as those produced by Mead-Westvaco under the tradename Aqua-Gard, and mixtures of these. This embodiment of the cartridge can desirably be coupled with carbon block purification, which may be formed from coconut shell carbon and a polymeric binder, such as those known in the art.

Without wishing to be bound by any theory, it is believed that when the powdered purification media contains particles having particular pore volume and pore distribution characteristics, they are able to perform their purification function with significantly reduced pressure drop. For example, it is desirable for the powdered purification materials to have a BET specific surface area ranging between about 1200 $m^2/g$ and about 1800 $m^2/g$, more particularly between about 1400 $m^2/g$ and about 1600 $m^2/g$, even more particularly around 1500 $m^2/g$.

In another particular embodiment, the particulate purifying media contains particles having a pore distribution having an average large pore diameter ranging between about 200 Å and about 250 Å, more particularly around 228 Å to around 229 Å, and average small pore diameter ranging between about 30 Å and about 40 Å, more particularly about 34 Å to about 35 Å.

In another particular embodiment, the purifying media has a BJH cumulative pore volume ranging between about 0.133 $cm^3/g$ and about 0.622 $cm^3/g$, more particularly between about 0.135 $cm^3/g$ and about 0.617 $cm^3/g$, even more particularly between 0.136 $cm^3/g$ and about 0.614 $cm^3/g$, even more particularly, between about 0.592 $cm^3/g$ and about 0.614 $cm^3/g$, even more particularly, around 0.614 $cm^3/g$.

In another particular embodiment, it is desirable for the particulate purifying media to contain particles having a cumulative pore area ranging from about 50 m$^2$/g to about 366 m$^2$/g, more particularly from about 124 m$^2$/g to about 359 m$^2$/g, even more particularly from about 345 m$^2$/g to about 359 m$^2$/g, even more particularly, of about 355 m$^2$/g.

More particularly, it is desirable for the particulate purifying media to contain particles having a pore distribution in the ranges given below in Tables 1-4. The pore distribution is obtained using BJH Adsorption with N2 on a TriStar 3000 analyzer in an analysis bath at 77.30 K at a sample weight of 0.2104 g and sample density of 0.500 g/cm$^3$, without automatic degas. In the tables below, the Pore Diameter Range represents a pore size range within which each average diameter, incremental pore volume, cumulative pore volume, incremental pore area, and cumulative pore area, is determined.

In Table 1, ranges for average pore sizes (for pores within the given Pore Diameter Range) are given for a particular embodiment of particulate purifying media disclosed herein. A broader range is given above a narrower, more specific range.

In Table 2, ranges for incremental and cumulative pore volume (for pores within the given Pore Diameter Range) are given for a particular embodiment of particulate purifying media disclosed herein.

In Table 3, ranges for incremental and cumulative pore area (for pores within the given Pore Diameter Range) are given for a particular embodiment of particulate purifying media disclosed herein.

Figure 3:
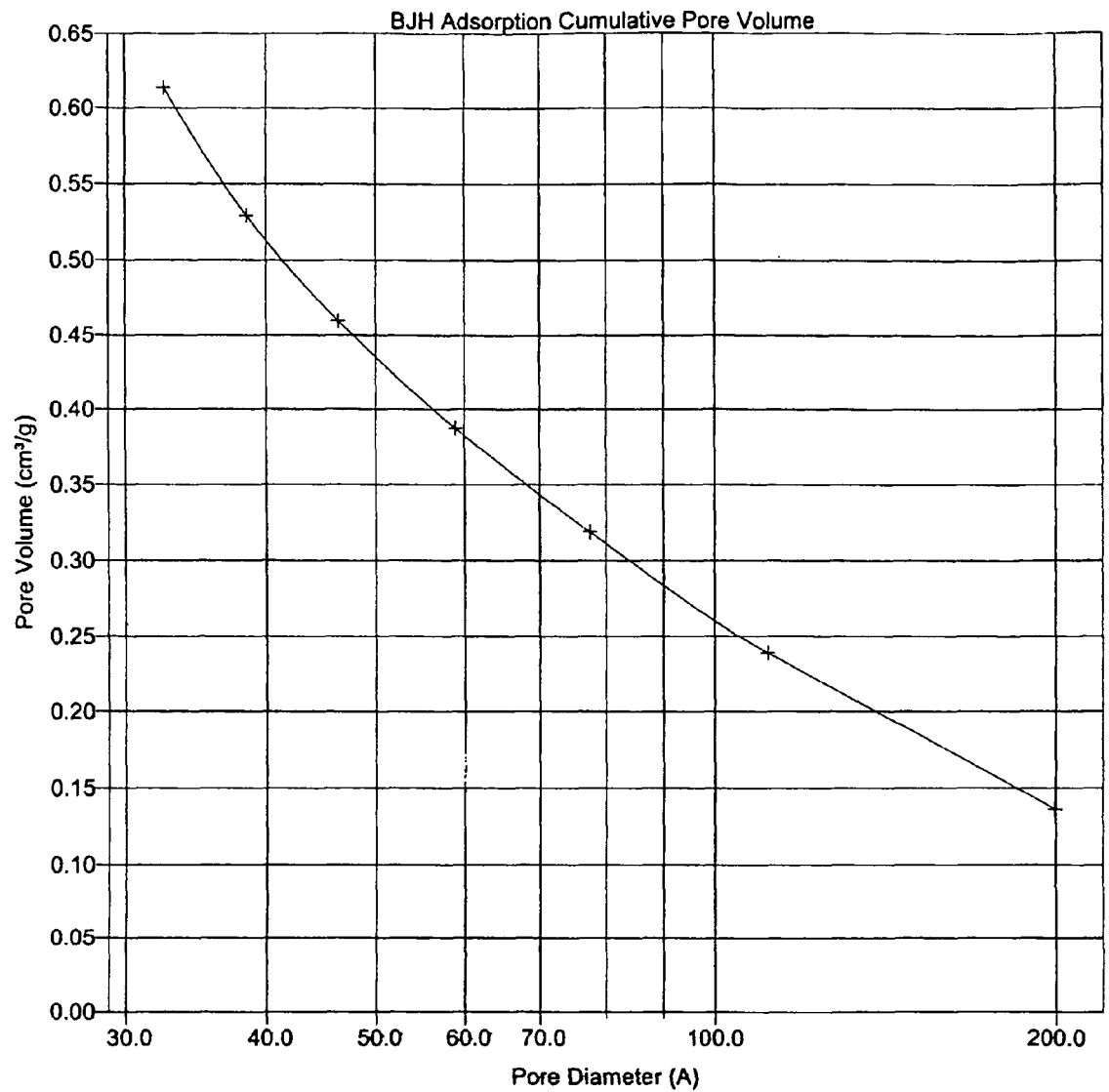
FIG. 3 is a graph showing BJH adsorption cumulative pore volume of a particulate purification media used in an embodiment described herein.
Figure 4:
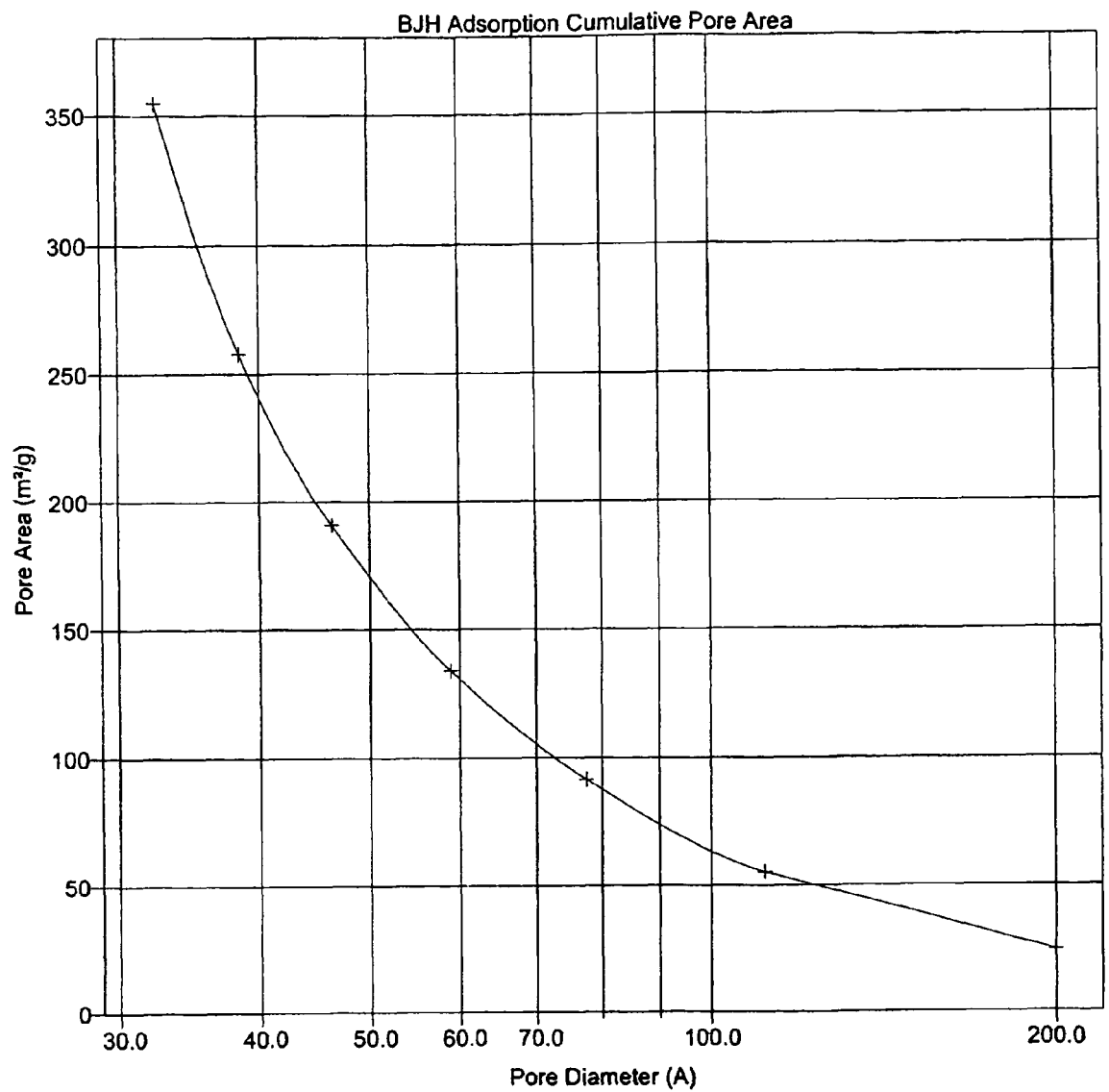
FIG. 4 is a graph showing BJH adsorption cumulative pore area of a particulate purification media used in an embodiment described herein.

In Table 4, a pore distribution is provided that is obtained for a MeadWestVaco Aquagard 80×325 activated carbon, under the conditions indicated above with respect to Tables 1-3. Cumulative pore volume and cumulative pore area are represented graphically in FIG. 3 and FIG. 4. This material was measured to have a single point surface area at P/P$_0$=0.309 of about 1474.9989 m$^2$/g, a BET surface area of 1501.7214 m$^2$/g, a BJH adsorption cumulative surface area of pores between 17 Å and 3000 Å diameter of 354.776 m$^2$/g, a single point adsorption total pore volume of pores less than 896.2091 Å diameter at P/P$_0$=0.97791077 of 1.232601 cm$^3$/g, an adsorption average pore diameter (4V/A by BET) of 32.8317 Å, and a BJH adsorption average pore diameter (4V/A) of 69.1984 Å.

In Table 5, a pore distribution is provided that is obtained using the same equipment as described above for Calgon MCAT 80×325 carbon, which does not provide the purification and pressure drop capabilities of the carbons used in the invention. This material was measured to have a single point surface area at P/P$_0$=0.318 of about 920.5223 m$^2$/g, a BET surface area of 891.6650 m$^2$/g, a BJH adsorption cumulative surface area of pores between 17 Å and 3000 Å diameter of 33.306 m$^2$/g, a single point adsorption total pore volume of pores less than 857.5782 Å diameter at P/P$_0$=0.97689362 of 0.521591 cm$^3$/g, an adsorption average pore diameter (4V/A by BET) of 23.3985 Å, and a BJH adsorption average pore diameter (4V/A) of 66.4491 Å. Table 5 is provided for comparative purposes.

TABLE 1

| Pore Diameter Range (Å) | Average Pore Diameter (Å) |
|---|---|
| 896.2-199.8 | about 220-235 |
|  | about 225-230 |
| 199.8-111.5 | about 125-135 |
|  | about 128-132 |
| 111.5-77.5 | about 80-90 |
|  | about 85-89 |
| 77.5-58.9 | about 60-70 |
|  | about 62-68 |
| 58.9-46.3 | about 48-52 |
|  | about 49-51 |
| 46.3-38.4 | about 39-43 |
|  | about 39-42 |
| 38.4-32.4 | about 33-36 |
|  | about 34-35 |

TABLE 2

| Pore Diameter Range (Å) | Incremental Pore Volume (cm$^3$/g) | Cumulative Pore Volume (cm$^3$/g) |
|---|---|---|
| 896.2-199.8 | about 0.133-0.137 | about 0.133-0.137 |
|  | about 0.135-0.137 | about 0.135-0.137 |
| 199.8-111.5 | about 0.100-0.104 | about 0.233-0.241 |
|  | about 0.101-0.103 | about 0.236-0.240 |
| 111.5-77.5 | about 0.075-0.081 | about 0.308-0.322 |
|  | about 0.078-0.080 | about 0.314-0.320 |
| 77.5-58.9 | about 0.065-0.070 | about 0.373-0.392 |
|  | about 0.067-0.069 | about 0.381-0.389 |
| 58.9-46.3 | about 0.070-0.073 | about 0.443-0.465 |
|  | about 0.071-0.073 | about 0.452-0.462 |
| 46.3-38.4 | about 0.067-0.071 | about 0.510-0.536 |
|  | about 0.068-0.070 | about 0.520-0.532 |
| 38.4-32.4 | about 0.082-0.086 | about 0.592-0.622 |
|  | about 0.083-0.085 | about 0.603-0.617 |

TABLE 3

| Pore Diameter Range (Å) | Incremental Pore Area (m$^2$/g) | Cumulative Pore Area (m$^2$/g) |
|---|---|---|
| 896.2-199.8 | about 21-25 | about 21-25 |
|  | about 22-24 | about 22-24 |
| 199.8-111.5 | about 29-33 | about 50-58 |
|  | about 30-32 | about 52-56 |
| 111.5-77.5 | about 34-38 | about 84-96 |
|  | about 35-37 | about 87-93 |
| 77.5-58.9 | about 40-44 | about 124-140 |
|  | about 41-43 | about 128-136 |
| 58.9-46.3 | about 54-58 | about 178-198 |
|  | about 55-57 | about 183-193 |
| 46.3-38.4 | about 65-69 | about 243-267 |
|  | about 66-68 | about 249-261 |
| 38.4-32.4 | about 95-99 | about 338-366 |
|  | about 96-98 | about 345-359 |

TABLE 4

| Pore Diameter Range (Å) | Average Pore Diameter (Å) | Incremental Pore Volume (cm³/g) | Cumulative Pore Volume (cm³/g) | Incremental Pore Area (m²/g) | Cumulative Pore Area (m²/g) |
|---|---|---|---|---|---|
| 896.2-199.8 | 228.2 | 0.136251 | 0.136251 | 23.878 | 23.878 |
| 199.8-111.5 | 130.6 | 0.102741 | 0.238993 | 31.458 | 55.336 |
| 111.5-77.5 | 87.8 | 0.079868 | 0.318861 | 36.385 | 91.721 |
| 77.5-58.9 | 65.3 | 0.068660 | 0.387521 | 42.078 | 133.799 |
| 58.9-46.3 | 50.8 | 0.072227 | 0.459748 | 56.840 | 190.639 |
| 46.3-38.4 | 41.5 | 0.069580 | 0.529327 | 67.104 | 257.743 |
| 38.4-32.4 | 34.8 | 0.084421 | 0.613748 | 97.033 | 354.776 |

TABLE 5

| Pore Diameter Range (Å) | Average Pore Diameter (Å) | Incremental Pore Volume (cm³/g) | Cumulative Pore Volume (cm³/g) | Incremental Pore Area (m²/g) | Cumulative Pore Area (m²/g) |
|---|---|---|---|---|---|
| 857.7-198.3 | 227.3 | 0.012591 | 0.012591 | 2.216 | 2.216 |
| 198.3-108.2 | 126.9 | 0.008225 | 0.020816 | 2.592 | 4.808 |
| 108.2-75.9 | 85.9 | 0.006225 | 0.027041 | 2.900 | 7.708 |
| 75.9-58.1 | 64.3 | 0.006148 | 0.033193 | 3.824 | 11.532 |
| 58.1-46.6 | 50.8 | 0.006486 | 0.039675 | 5.103 | 16.635 |
| 46.6-39.9 | 42.6 | 0.005786 | 0.045460 | 5.432 | 22.067 |
| 39.9-32.5 | 35.3 | 0.009958 | 0.055419 | 11.293 | 33.360 |

Other possibilities for powdered purification materials include spray dried agglomerates of particles described in U.S. Ser. No. 10/681,597, filed Oct. 8, 2003.

After passing through the powdered purification media, the treated water is then forced through a porous filtration block. The porous filtration block generally has a micron rating ranging between about 0.5 to 10 micron. The porous filtration block may be carbon block (activated carbon bonded together with a polymeric binder), e.g., of the type described in published U.S. Patent Application Nos. 2001-0042719, published Nov. 22, 2001 and 2002-0195407, published Dec. 26, 2002, and in U.S. Ser. No. 10/445,410 filed May 27, 2003. Alternatively, the porous filtration block may be a porous polymer block, such as a block of high density polyethylene (HDPE). In particular, HDPE having low melting index and high hydrophilicity is particularly suitable. One such HDPE is GUR polyethylene (Ticona). An alternative the block may be low density polyethylene, which can be molded or extruded. The carbon particles used in the carbon block may be of the same type as disclosed above for use in the powdered purification material.

In another embodiment, the porous block can be a fibrous block formed from carbon fibers, polyester fibers, and a binder resin. The block can optionally contain particulate carbon as well. More particularly, a porous block containing about 5 wt % to about 10 wt % of carbon fiber having an average diameter of about 20-40 .mu.m, about 80 wt % to about 85 wt % particulate coconut shell carbon of the type described above, about 5 wt % polyester fibers, and about 6 wt % of acrylic binder resin is used as the porous filtration block. It is also possible to eliminate the particulate carbon, so that 100% of the carbon in the porous filtration block is carbon fiber. This carbon fiber is combined with polyester fiber, as well as acrylic binder resin. Suitable porous blocks of this type include carbon fiber-containing blocks such as MOF-EI, produced by Fujimoto, and those produced by Futamura and Osaka Gas.

In a particular embodiment of the invention, the components described above are combined into a single cartridge, leading to ease of handling by the user. An annular cavity is formed into which the powdered purification media is packed. The inner surface of this annular cavity may be formed by the outer surface of the porous filtration block, or may be formed from a porous polymeric membrane that is in contact with the porous filtration block. The outer surface of the annular cavity is formed from a porous layer, desirably a porous HDPE, such as the GUR polyethylene described above. This material can also have a micron rating in the 10 to 200 range, although all that is necessary for proper functioning of the cartridge is that the porous layer be sufficiently porous to admit the desired flow rate of water, while the pores are sufficiently small that the media is retained within the annular cavity.

The cartridge can be used in a housing piped into a water purification system, as is known in the art. For example, the cartridge can be disposed in a housing that depends from a piping system, and which contains an inlet supplying water to be treated. The housing surrounds the cartridge, so that water is forced through the outer surface of the height of the cylindrical cartridge, passes through the porous layer, then through the powdered purification media, then through any intermediate layers, then through the porous filtration block. The purified water then leaves the porous filtration block, passes through any final porous layers, and enters the inner annular opening through which it exits the cartridge. The exiting water then passes through an outlet in the housing, which is in fluid communication with the inner annular opening.

EXAMPLES

The invention can be more clearly understood with respect to the following non-limiting examples.

Example 1

A 4.5 inch diameter shell made of porous GUR HDPE (Ticona) having a bulk density of approximately 0.85 g/cc and a micron rating of 20 to 100 micron was filled with a 80.times.325 mesh hollow core carbon produced by MeadWestVaco under the tradename AquaGuard, and vibrated for 10 min on an FMC Syntron J60 Jogger vibrating table on maximum power until compacted in the tube. The center core of the filter was a 2 inch diameter carbon fiber-containing block produced by Futumora.

The carbon block was adhered to the porous shell, and the carbon-containing media introduced and the assembly vibrated as described above. After 10 minutes, the level of particulate was the same as the level of the central core. A cap was then affixed to the top of the shell, sealing the media in the annular space between the core and the shell.

Example 2

The procedures described in Example 1 were followed, except that the activated carbon particles were a mixture of 50% of 80.times.325 mesh AquaGuard carbon particles and 50% 50.times.200 mesh acid-washed coconut shell carbon.

Example 3

The purification cartridge of Example 1 was tested for particulate reduction. Challenge water containing fluorescent microspheres having particle sizes in the range of 3 to 7 .mu.m in a concentration of about 67,000 per cubic centimeter was cycled through the cartridge using a duty cycle of 15 minutes on and 15 minutes off, and a flow rate of about 6.8 gpm. Water from the influent and effluent streams were sampled at the beginning of the test, and again after the indicated volume of water had been processed through the purification apparatus. The particulate levels of the samples were measured by counting in an optical microscope. The amount of particulate reduction was computed and the results are presented in Table 6 below.

TABLE 6

| Volume Processed (gal.) | Percent Reduction |
| --- | --- |
| Start | 0 |
| 100 | 99.99 |
| 200 | 99.99 |
| 300 | 99.99 |
| 400 | 99.99 |
| 500 | 99.99 |
| 600 | 99.99 |
| 700 | 99.99 |
| 800 | 99.99 |
| 900 | 99.99 |
| 1200 | 99.99 |
| 2326 | 99.99 |
| 2687 | 99.99 |
| 3721 | 99.99 |
| 4340 | 99.99 |
| 5335 | 99.99 |

As is apparent, even with a high volumetric flow rate, the filtration cartridge and method of the invention is extremely effective at removing fine particulates from water.

Example 4

The purification cartridge of Example 2 was tested for removal of chloramine. Challenge water containing about 3.0 ppm chloramines at pH of about 9 was cycled through a purification cartridge using a duty cycle of 10 minutes on and 10 minutes off. Water from the influent and effluent streams were sampled and their chloramines levels measured by Hack spectrometer for chloramine. The results are presented in Table 7 below. Again, the sampling occurred after the indicated volume of water had passed through the device.

TABLE 7

| Volume (gal.) | Flow rate (gpm) | Effluent chloramines (ppm) | Influent choramine (ppm) |
| --- | --- | --- | --- |
| Start | 2.2 | 0.01 | 2.90 |
| 1500 | 2.2 | 0.01 | 2.95 |
| 2000 | 2.3 | 0.01 | 3.04 |
| 4000 | 2.4 | 0.01 | 3.10 |
| 6000 | 2.3 | 0.01 | 3.25 |
| 8000 | 2.3 | 0.00 | 2.98 |
| 10000 | 2.2 | 0.01 | 3.08 |
| 12000 | 2.2 | 0.18 | 3.05 |
| 14000 | 2.1 | 0.30 | 3.22 |
| 16000 | 2.1 | 0.49 | 2.92 |

The experiment indicates that, even at high flow rates, levels of chloramines do not begin to rise above virtually undetectable levels until after large volumes of water (12,000 gal.) have been processed through the apparatus.

In addition, the purification cartridge of Example 2 was tested for chlorine removal by contacting it with challenge water containing 4 ppm chlorine (calculated as hypochlorite) at a flow rate of 5.1 gpm. Water from the effluent was sampled after treatment of the volumes indicated below in Table 3, and samples were evaluated for chlorine content by standard EPA methods for chlorine testing. Similar testing was carried out using the same water and flow conditions, but replacing the filtration cartridge of Example 2 with a commercially available filter from KX Industries, sold under the tradename CTO and having a micron rating of 5 microns. The resulting chlorine levels in ppm for each sample are provided below in Table 8.

TABLE 8

| Volume (gal.) | Chlorine level, ppm Example 2 | Chlorine level, ppm Comparative filter |
| --- | --- | --- |
| 5,000 | 0.01 | 2.56 |
| 10,000 | 0.01 | 2.71 |
| 15,000 | 0.01 | 3.78 |
| 30,000 | 0.01 | 4.01 |
| 35,000 | 0.01 | 4.01 |
| 40,000 | 0.01 | 4.01 |
| 45,000 | 0.01 | 4.01 |
| 50,000 | 0.01 | 4.01 |
| 55,000 | 0.01 | 4.01 |
| 60,000 | 0.01 | 4.01 |

These results indicate that unexpectedly superior levels of chlorine reduction are obtained using the filtration cartridge of the invention when compared to commercially available carbon block filters.

What is claimed is:

1. A water purification cartridge, comprising:
   (a) a first porous layer having an inner surface and an outer surface;
   (b) a porous purification block having an outer surface and an inner surface, and at least partially enclosed by the first porous layer;
   (c) a cavity between the inner surface of the first porous layer and the outer surface of the porous purification block and in fluid communication with the porous purification block; and
   (d) a purification media comprising catalytic carbon disposed within the cavity, wherein the purification media has a particle size distribution ranging from about 80 mesh to about 325 mesh;

wherein water can flow from the outer surface of the first porous layer to the inner surface of the porous purification block.

2. The water purification cartridge according to claim 1, wherein the particle size distribution has a mean particle size between a first particle size at which about 36% of the particles in the particle size distribution are smaller than the first particle size and a second particle size at which about 85% of the particles in the particle size distribution are smaller than the second particle size.

3. The water purification cartridge according to claim 1, wherein said cartridge is effective to reduce chloramine in 2,000 gallons of water from an influent level of at least about 3 ppm to an effluent level of no more than about 0.01 ppm at a flow rate of at least 2 gpm.

4. The water purification cartridge according to claim 3, wherein the outer surface of the first porous layer has a diameter of about 4.5 inches and the porous purification block has a diameter of about 2 inches.

5. The water purification cartridge according to claim 1, wherein said cartridge is effective to reduce chloramine in 4,000 gallons of water from an influent level of at least about 3 ppm to an effluent level of no more than about 0.01 ppm at a flow rate of at least 2 gpm.

6. The water purification cartridge according to claim 5, wherein the outer surface of the first porous layer has a diameter of about 4.5 inches and the porous purification block has a diameter of about 2 inches.

7. The water purification cartridge according to claim 1, wherein said cartridge is effective to reduce chloramine in 6,000 gallons of water from an influent level of at least about 3 ppm to an effluent level of no more than about 0.01 ppm at a flow rate of at least 2 gpm.

8. The water purification cartridge according to claim 7, wherein the outer surface of the first porous layer has a diameter of about 4.5 inches and the porous purification block has a diameter of about 2 inches.

9. The water purification cartridge according to claim 1, wherein said cartridge is effective to reduce chloramine in 10,000 gallons of water from an influent level of at least about 3 ppm to an effluent level of no more than about 0.01 ppm at a flow rate of at least 2 gpm.

10. The water purification cartridge according to claim 9, wherein the outer surface of the first porous layer has a diameter of about 4.5 inches and the porous purification block has a diameter of about 2 inches.

11. A water purification cartridge, comprising:
(a) a first porous layer having an inner surface and an outer surface;
(b) a porous purification block having an outer surface and an inner surface, and at least partially enclosed by the first porous layer;
(c) a cavity between the inner surface of the first porous layer and the outer surface of the porous purification block and in fluid communication with the porous purification block; and
(d) a purification media comprising catalytic char disposed within the cavity, wherein the purification media has a particle size distribution ranging from about 50 mesh to about 375 mesh;
wherein water can flow from the outer surface of the first porous layer to the inner surface of the porous purification block.

12. The water purification cartridge according to claim 11, wherein the particle size distribution has a mean particle size between a first particle size at which about 36% of the particles in the particle size distribution are smaller than the first particle size and a second particle size at which about 85% of the particles in the particle size distribution are smaller than the second particle size.

13. The water purification cartridge according to claim 11, wherein said cartridge is effective to reduce chloramine in 2,000 gallons of water from an influent level of at least about 3 ppm to an effluent level of no more than about 0.01 ppm at a flow rate of at least 2 gpm.

14. The water purification cartridge according to claim 13, wherein the outer surface of the first porous layer has a diameter of about 4.5 inches and the porous purification block has a diameter of about 2 inches.

15. The water purification cartridge according to claim 11, wherein said cartridge is effective to reduce chloramine in 4,000 gallons of water from an influent level of at least about 3 ppm to an effluent level of no more than about 0.01 ppm at a flow rate of at least 2 gpm.

16. The water purification cartridge according to claim 15, wherein the outer surface of the first porous layer has a diameter of about 4.5 inches and the porous purification block has a diameter of about 2 inches.

17. The water purification cartridge according to claim 11, wherein said cartridge is effective to reduce chloramine in 6,000 gallons of water from an influent level of at least about 3 ppm to an effluent level of no more than about 0.01 ppm at a flow rate of at least 2 gpm.

18. The water purification cartridge according to claim 17, wherein the outer surface of the first porous layer has a diameter of about 4.5 inches and the porous purification block has a diameter of about 2 inches.

19. The water purification cartridge according to claim 11, wherein said cartridge is effective to reduce chloramine in 10,000 gallons of water from an influent level of at least about 3 ppm to an effluent level of no more than about 0.01 ppm at a flow rate of at least 2 gpm.

20. The water purification cartridge according to claim 19, wherein the outer surface of the first porous layer has a diameter of about 4.5 inches and the porous purification block has a diameter of about 2 inches.

21. A water purification cartridge, comprising:
(a) a first porous layer having an inner surface and an outer surface;
(b) a porous purification block having an outer surface and an inner surface, and at least partially enclosed by the first porous layer;
(c) a cavity between the inner surface of the first porous layer and the outer surface of the porous purification block and in fluid communication with the porous purification block; and
(d) a purification media comprising catalytic char disposed within the cavity, wherein the purification media has a particle size distribution ranging from about 80 mesh to about 325 mesh;
wherein water can flow from the outer surface of the first porous layer to the inner surface of the porous purification block.

22. The water purification cartridge according to claim 21, wherein the particle size distribution has a mean particle size between a first particle size at which about 36% of the particles in the particle size distribution are smaller than the first particle size and a second particle size at which about 85% of the particles in the particle size distribution are smaller than the second particle size.

23. The water purification cartridge according to claim 21, wherein said cartridge is effective to reduce chloramine in 2,000 gallons of water from an influent level of at least about 3 ppm to an effluent level of no more than about 0.01 ppm at a flow rate of at least 2 gpm.

24. The water purification cartridge according to claim 23, wherein the outer surface of the first porous layer has a diameter of about 4.5 inches and the porous purification block has a diameter of about 2 inches.

25. The water purification cartridge according to claim 21, wherein said cartridge is effective to reduce chloramine in 4,000 gallons of water from an influent level of at least about 3 ppm to an effluent level of no more than about 0.01 ppm at a flow rate of at least 2 gpm.

26. The water purification cartridge according to claim 25, wherein the outer surface of the first porous layer has a diameter of about 4.5 inches and the porous purification block has a diameter of about 2 inches.

27. The water purification cartridge according to claim 21, wherein said cartridge is effective to reduce chloramine in 6,000 gallons of water from an influent level of at least about 3 ppm to an effluent level of no more than about 0.01 ppm at a flow rate of at least 2 gpm.

28. The water purification cartridge according to claim 27, wherein the outer surface of the first porous layer has a diameter of about 4.5 inches and the porous purification block has a diameter of about 2 inches.

29. The water purification cartridge according to claim 21, wherein said cartridge is effective to reduce chloramine in 10,000 gallons of water from an influent level of at least about 3 ppm to an effluent level of no more than about 0.01 ppm at a flow rate of at least 2 gpm.

30. The water purification cartridge according to claim 29, wherein the outer surface of the first porous layer has a diameter of about 4.5 inches and the porous purification block has a diameter of about 2 inches.

* * * * *